Feb. 10, 1953          W. H. LAKE          2,628,318
METHOD AND DEVICE FOR CONTROLLING ELECTRICAL DEMAND
Filed Nov. 20, 1950
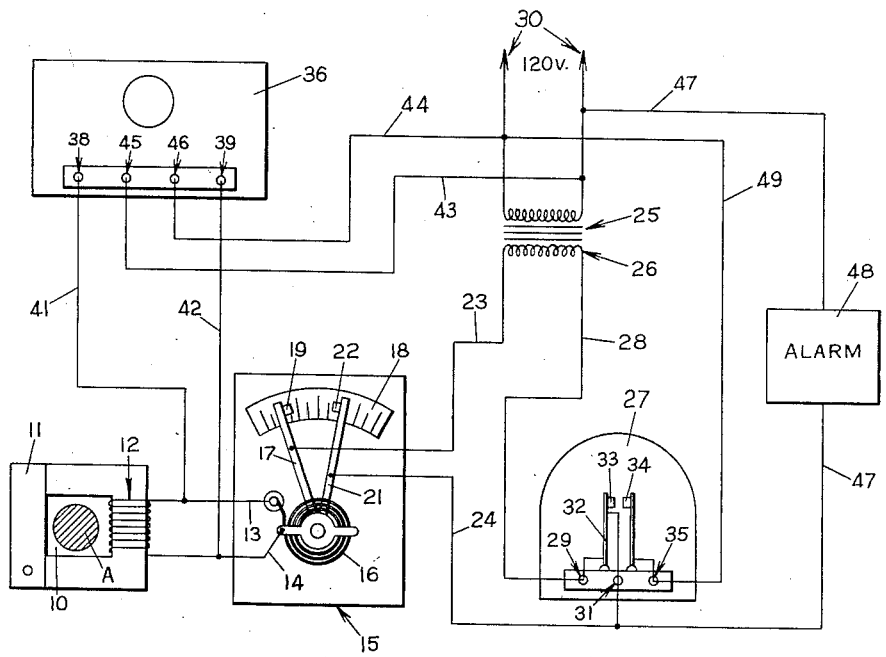
fig. 1
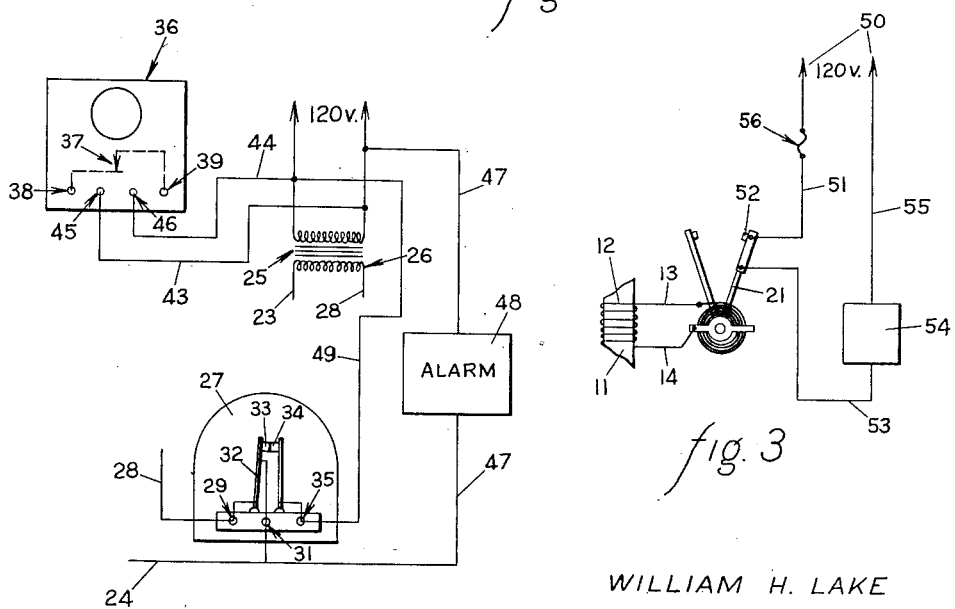
fig. 2
fig. 3
WILLIAM H. LAKE
Inventor
By
Attorney Patented Feb. 10, 1953

2,628,318

UNITED STATES PATENT OFFICE 2,628,318

METHOD AND DEVICE FOR CONTROLLING ELECTRICAL DEMAND

William H. Lake, Muskegon, Mich.

Application November 20, 1950, Serial No. 196,693

5 Claims. (Cl. 307—35)

This invention relates to a method and device for controlling electrical demand and more specifically to a method and means for indicating the arrival at a predetermined electrical demand integrated over a period of time.

As is well known by manufacturers using electrical power, companies supplying such power in some circumstances encourage the utilization of electric energy during the times when system demands for such energy are low by offering premium rates for use of energy at these times. They sometimes refer to these periods as "off peak hours."

Under the demand system of billing the charge to a consumer is determined in part by the integrated demand of the consumer during a particular interval of time. If the consumer, by properly regulating the period of operation of equipment creating heavy current load, can keep down his demand during the "on peak hours," by running his heavy load equipment during the "off peak hours," he can obtain considerable savings in his cost of electric service.

Thus, the advantage of a method, and of a meter or device to effectuate said method, for indicating the integrated demand during certain periods of the day or during "on peak hours" and for effecting a desired action when said demand exceeds a predetermined maximum, is readily seen.

As used in this specification, the term "demand" shall be understood to mean either amperes or kilo-volt amperes. In order to take advantage of favorable rates, it is necessary that a series of instantaneous demands be integrated for some predetermined period of time. Mechanical devices have been proposed for this purpose, but these, together with necessary auxiliary equipment, are too expensive for general acceptance.

Therefore, it is a principal object of this invention to provide a method for measuring the demand in a power line and for actuating selected means, such as means sounding a warning when the amperes flowing through said line tends to exceed a predetermined maximum for a predetermined period of time.

Another object of this invention is the provision of a means, whereby said method may be practiced, having an electrically responsive indicator, which will actuate a relay when the indicator registers a predetermined integrated demand.

Another object of this invention is to provide a means, as set forth above, which may be applied directly to an outside power line to determine demand but without requiring any direct connection therewith.

Another object of this invention is to provide a demand meter having a current actuated indicator arm with an electrical contact, and a current level control arm with an electrical contact, whereby engagement of said contacts will actuate a relay for operating or initiating the operation of desired apparatus, such as an alarm.

A further object of this invention is to provide a demand meter, as aforesaid, having means to prevent response of the alarm to momentary and isolated surges in the demand.

Other objects of this invention will become apparent to persons familiar with this type of equipment upon referring to the accompanying drawings and reading the following specification.

In the drawings:

Figure 1 is a diagram of an electrical system whereby my method may be practiced by employing my demand limitator.

Figure 2 represents a diagram of a portion of the device with the time relay in its closed position.

Figure 3 shows a modification of the device.

General description

In this invention, a current is induced in a circuit separate from the conductor on which the load to be controlled is carried, which current is variable and instantaneously proportional to the instantaneous current in the said line. The instantaneous values of said induced current are then integrated over a predetermined period of time, and the summation thereof is utilized in any of several ways, as to sound an alarm, add capacitance or to shut off equipment. In a preferred embodiment of a device for practicing this method, the induced current is passed through a resistance element, which element changes shape as it is heated. By utilizing this change of shape to actuate a relay, the necessary integration of the several instantaneous demands is secured. More specifically, I have provided a transformer core adapted for removably surrounding a power line; a transformer coil wound around said core; a thermal type maximum demand meter connected to said coil; a thermal responsive indicator having a switch contact thereon; manually movable means for carrying a switch contact which may be engaged by said current actuated indicator switch; and means actuating desired apparatus, as an alarm, upon contacting of said switches.

Detailed description

In the following description of my invention I will not describe any details of the packaged unit embodying my invention, and by which my method may be practiced, as such details of construction are well known in the art. As an example of how many of the details of construction may be accomplished, reference may be had to Patent No. 2,165,290 showing the construction of one specific form of a split core transformer in association with a thermal type ammeter.

Referring to Figure 1 in the drawings, a power line A is disposed in the central opening 10 of a split core current transformer 11.

The split core transformer 11, is of the conventional, laminated. type built up of a series of plates which are substantially U-shaped and have a hinged, laminated, bar for closing the end of the U, thus leaving a hollow space in the center when the two sections of the transformer are brought together. The opening 10 at the center of the transformer 11 is preferably made sufficiently large to receive a standard size power input line and with sufficient room to mount the coil 12 around one leg of the core. The coil 12, which constitutes a secondary winding to the transformer 11, is preferably made with about sixty loops.

The lead wires 13 and 14, from the coil 12, are connected to a thermal type maximum demand meter 15, which is well known in the art, as illustrated by said Patent No. 2,165,290. While it is not intended that the internal construction of the thermal demand meter 15 form any part of this invention, basically such a meter consists of a coiled bimetallic element 16, whose inner and outer ends are connected to the leads 13 and 14, respectively. The current flow through element 16, which is directly proportional to the flow of current through the line A, heats the element 16 proportionately also, thereby causing said element to expand and uncoil in a conventional manner. The element 16, being anchored at one end and attached to the current actuated indicator 17 at its other end, expansion of said element effects a movement of the indicator 17 along the properly graduated scale 18. Thus, the current in line A is shown by indicator 17 on scale 18. Whereas the current flow through line A may fluctuate widely, the heat change in the element 16 will be much less responsive and thereby effect an integration of the said current fluctuations. Thus, the indicator 17 will respond to demand over a predetermined period of time. rather than to current at a given instant. In this way it has been discovered that the desired integration of instantaneous current magnitudes may be accomplished effectively and without complex apparatus.

The indicator 17, which is responsive to the expansion of the bimetallic element 16. has a contact 19 at its upper end. A manually controlled indicator 21. which is preferably pivoted about the same axis as indicator 17, is provided with means for manual adjustment thereof along the scale 18 and has a contact 22 secured to its upper end and engageable by the contact 19 on the indicator 17.

Attached to the indicator arms 17 and 21, respectively, are a pair of conductors 23 and 24. The conductor 23 is connected to the secondary winding 26 of the step-down transformer 25, which is preferably of the 120-6 volt type. The primary winding of transformer 25 is connected to a 120 volt power source 30. The secondary 26 is connected through conductor 28 to terminal 29 of a conventional time delay relay 27. The conductor 24 connects the terminal 31 of the relay 27 to the indicator arm 21.

In the embodiment here shown the terminals 29 and 31 are connected to a bimetallic arm 32 of high resistance which, when heated by the passage of current therethrough, moves the contact 33 into engagement with the contact 34, thereby effecting connection between the terminals 35 and 31 of said relay after a potential has existed for a predetermined time across the terminals 29 and 31.

The time clock 36, or time switch, is of any standard type in which a pair of terminals are connected and disconnected at predeterminable times and for predeterminable periods of time. In this embodiment, the switch 37 (Figure 2) is opened and closed by the clock mechanism for the purposes hereinafter explained.

The terminals 38 and 39 of the time clock 36 are connected in parallel with the thermal demand meter 15 across the lead lines 13 and 14 by means of the conductors 41 and 42, respectively. Lines 43 and 44 connect the terminals 45 and 46 of the clock to the power source 30 for energizing same. Conductor 47 connects the power source 30 with the terminal 31 of the relay 27 through an alarm 48. The other side of the power source 30 is connected through conductor 49 to terminal 35 of the delay switch 27.

Operation

In describing the operation of my demand limitator, and thereby the practice of my method, I shall assume first that the operations are taking place during the "off-peak" hours of the day when the power rates are low. In this case, the demand limitator will be set to allow any amount of demand to flow through the power line A. This can be accomplished by setting the time clock 36 and the switch 37 so that the connection is closed between terminals 38 and 39 (Figures 3 and 1).

With the system in this condition, the current flows from the lead lines 13 and 14 through the lead lines 41 and 42. Thus, due to the high resistance in the thermal demand meter 15, practically no current flows through the thermal demand meter; and the current actuated indicator 17 will remain at a zero reading.

Now, assuming that operations are taking place during the peak hours of the day, and since a large demand is expensive, it is desirable to keep down the maximum amount of demand during those hours. In this situation, the manually operated indicator 21 is set at the maximum demand reading desired, and the time clock 36. which operates switch 37, is set so that during those particular hours the switch 37 is open. As the demand rises in power line A, an E. M. F. is set up in the coil 12 and a potential is created between its ends. Since switch 37 is open, the current flows through the lines 13 and 14 and heats the bimetallic element 16 thereby moving the indicator 17 along the calibrated scale 18 which shows the amount of current flowing through the power line A. The heating of this bimetallic element will not follow the instantaneous variations in current in the induced circuit but it will be responsive to the total, or integrated energy supplied for a given time interval. Accordingly, when the demand on line A reaches the predetermined maximum, the contact 19 engages the contact 22, thereby connecting the conductors 23 and 24. Thus the closing of a control switch is secured by a very simply effected integration of the instantaneous currents and the demand is thereby accurately controlled without the complex mechanical, or other, apparatus formerly considered necessary.

The T. M. F. imposed by the secondary 26 of the transformer 25 now passes current through the conductor 28 to the time delay relay 27 and back through the conductors 23 and 24 to the secondary winding 26. No current will pass to the alarm 32, however, until a period of time has passed to effect contact between the contacts 33 and 34 of the time delay relay 27. This time interval is desirable to prevent sounding of the alarm 48 until the contacts 19 and 22 are firmly seated. However, once the contact between the indicator arms 17 and 21 is firmly established, the contacts 33 and 34 of the relay 27 will connect the terminals 35 and 31, and thus close the circuit to the alarm 48, or other output. Once this circuit is closed, current will flow from the 120 volt source 30 through the line 47, the alarm 48 and return through the contacts 33 and 34 of the relay 27 and the conductor 49. By the sounding of the alarm, the plant operators are apprised of the power demand situation and may take whatever steps are appropriate.

It is to be understood that my demand limitator and method practiced thereby will work without the use of the time delay relay or the time clock, to limit demand to a predetermined maximum during a single predetermined period of time. However, in describing my invention I have disclosed a preferred method of operation taking advantage of its full utility.

As an alternate construction used in certain instances to practice my method, there is shown partially equivalent structure in Figure 3 of the drawings. In this modification, the parts are all identical with those shown in Figure 1 excepting as hereinafter described. The current source 50 is connected on one side by the conductor 51 through the fuse 56 to one terminal of a micro-switch 52, which micro-switch is supported upon the manually adjustable arm 21 in place of the previously existing contact 22. The other terminal of said micro-switch 52 is connected by a conductor 53 to one side of the alarm 54, which alarm may be replaced by a relay for other controlling devices as needed. The other side of said alarm is connected by the conductor 55 to the other side of the power source 50. In this modification, therefore, line voltage is applied to the circuit including the alarm 54 and the micro-switch 52 so that the transformer 25 is omitted. Also, the time delay switch 27 is omitted inasmuch as in some instances it has been found unnecessary.

In the apparatus herein disclosed illustratively, I have utilized an alarm as the specific means to be actuated by my device, but it will be readily appreciated that other means may be controlled in its place, such as a relay for disconnecting certain apparatus or a relay for connecting capacitance to improve the power factor.

Although the above mentioned drawings and descriptions apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In a method for controlling electrical demand on a line conductor the steps: inducing into a circuit separate from said conductor a current proportional at any given instant to the instantaneous current in said conductor; automatically shorting said circuit during, but only during, off-peak hours; utilizing said induced current during peak hours to heat an electrically resistive element; causing said element to effect a mechanical motion upon such heating, the magnitude of said motion being a function of such heating; utilizing said mechanical motion to close a switch upon said motion's reaching a preselected magnitude.

2. In a method for controlling electrical demand on a line conductor the steps: inducing into a circuit separate from said conductor a current proportional at any given instant to the instantaneous current in said conductor; automatically shorting said circuit during, but only during, off-peak hours; utilizing said induced current during peak hours to create a detachable condition which represents an integration for a predetermined period of time of the instantaneous values of said induced current during said period; utilizing said condition to close a switch upon said condition's reaching a preselected magnitude.

3. In a device for actuating a relay upon the attainment of a predetermined level of alternating current flowing through a conductor, the combination: a core adapted for surrounding said conductor; a winding on said core bearing to said conductor the same relationship as a secondary winding bears to a primary winding in a transformer; a high resistance element adapted to change its shape a predeterminable amount upon being subjected to electrical potential for a predetermined period of time; means electrically connecting said winding to said element; linkage movable by a change in shape of said element; a manually movable means carrying a switch, the same being movable in the line of movement of an element of said linkage and contactable thereby for opening and closing; a circuit including a source of energy, said switch and means to be controlled by said switch; whereby said switch will open and close said circuit and thereby actuate a control or other circuit upon the occurrence of a predetermined demand level in said conductor for a predetermined period of time.

4. In a device for actuating a relay upon the attainment of a predetermined level of alternating current flowing through a conductor, the combination: a core adapted for surrounding said conductor; a winding on said core bearing to said conductor the same relationship as a secondary winding bears to a primary winding in a transformer; a high resistance element adapted to change its shape a predeterminable amount upon being subjected to electric current flow for a predetermined period of time; means electrically connecting said winding to said element; linkage movable by change in shape of said element, a manually movable means carrying a switch, the same being movable in the line of movement of an element of said linkage and contactable thereby for opening and closing; a circuit including a source of energy, said switch, and the current actuated portion of a time delay relay; another circuit including a source of energy, the contact portion of said time delay relay and means to be controlled by said device; and a time switch and means connecting same through a relatively low resistance in parallel with said high resistance element for rendering said device substantially inoperative at predeterminable times and for predeterminable periods; whereby said device will actuate said means to be controlled in response to the electrical demand placed on the source connected by said conductor during predeterminable portions of a day without making any direct connection to said conductor.

5. In a device for controlling electrical demand on a line conductor, the combination: a circuit separate from said line conductor and means inducing thereinto a current proportional at any given instant to the instantaneous current in said conductor; electrical resistance means in said circuit integrating the instantaneous values of said induced current over a selected interval of time, said means being such as to produce a detectable condition therein upon the summation of said values reaching a pre-selected magnitude; a switch and means responsive to said detectable condition upon its reaching a pre-selected magnitude for closing said switch.

WILLIAM H. LAKE.

REFERENCES CITED

The following references are of record in the file of this patent:

UNITED STATES PATENTS

| Number | Name | Date |
|---|---|---|
| 1,314,471 | Gow | Aug. 26, 1919 |
| 1,871,170 | Freyer | Aug. 9, 1930 |